United States Patent
Simeral et al.

(10) Patent No.: US 7,287,145 B1
(45) Date of Patent: Oct. 23, 2007

(54) SYSTEM, APPARATUS AND METHOD FOR RECLAIMING MEMORY HOLES IN MEMORY COMPOSED OF IDENTICALLY-SIZED MEMORY DEVICES

(75) Inventors: Brad W. Simeral, San Francisco, CA (US); Sean Jeffrey Treichler, Mountain View, CA (US); David G. Reed, Saratoga, CA (US); Roman Surgutchik, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 294 days.

(21) Appl. No.: 11/012,006

(22) Filed: Dec. 13, 2004

(51) Int. Cl.
*G06F 9/26* (2006.01)
*G06F 9/34* (2006.01)
*G06F 12/00* (2006.01)

(52) U.S. Cl. ...................... 711/202; 711/200
(58) Field of Classification Search ............. 711/202, 711/1, 2, 5, 101, 117, 200; 714/5
See application file for complete search history.

(56) References Cited

U.S. PATENT DOCUMENTS

| | | | |
|---|---|---|---|
| 6,108,745 A * | 8/2000 | Gupta et al. ............ 711/3 |
| 6,272,594 B1 * | 8/2001 | Gupta et al. ............ 711/127 |
| 6,360,305 B1 * | 3/2002 | Novak et al. ............ 711/157 |
| 6,405,286 B2 * | 6/2002 | Gupta et al. ............ 711/127 |
| 6,546,453 B1 * | 4/2003 | Kessler et al. ............ 711/5 |
| 6,625,685 B1 * | 9/2003 | Cho et al. ............ 711/5 |
| 6,968,440 B2 * | 11/2005 | Brueggen ............ 711/171 |
| 2003/0070055 A1 * | 4/2003 | Johnson et al. ............ 711/202 |
| 2004/0073767 A1 * | 4/2004 | Johnson et al. ............ 711/202 |
| 2004/0225858 A1 * | 11/2004 | Brueggen ............ 711/172 |
| 2005/0071536 A1 * | 3/2005 | Osborne ............ 711/5 |
| 2005/0108463 A1 * | 5/2005 | Hargis et al. ............ 711/5 |

OTHER PUBLICATIONS

Intel 820 Chipset: 82820 Memory Controller Hub (MCH), Datasheet, Nov. 1999, p. 30 last paragraph.*
Intel, "Intel® 820 Chipset: 82820 Memory Controller Hub (MCH)," Datasheet, Copyright © Intel Corporation, Nov. 1999, Document No: 290630-001, pp. 1-157.
Intel, "Intel® 850 Chipset: 82850 Memory Controller Hub (MCH)," Datasheet, Copyright © Intel Corporation, Nov. 2000, Document No: 290691-001, pp. 1-144.

* cited by examiner

*Primary Examiner*—Fred W Detschel
(74) *Attorney, Agent, or Firm*—Cooley Godward Kronish LLP

(57) ABSTRACT

A system, apparatus, and method are disclosed for increasing the physical memory size accessible to a processor, at least in part, by reclaiming physical address space typically associated with addresses of a restricted linear address space (i.e., addresses that are otherwise unusable by the processor as system memory). In one embodiment, an exemplary memory controller redirects a linear address associated with a range of addresses to access a reclaimed memory hole. The memory controller includes an address translator configured to determine an amount of restricted addresses and to establish a baseline address identified as a first number being a first integer power of 2. The range of addresses can be located at another address identified as a second number being a second integer power of 2. As such, the address translator translates the linear address into a translated address associated with the reclaimed memory hole based on the baseline address.

21 Claims, 8 Drawing Sheets

SYSTEM, APPARATUS AND METHOD FOR RECLAIMING MEMORY HOLES IN MEMORY COMPOSED OF IDENTICALLY-SIZED MEMORY DEVICES

BRIEF DESCRIPTION OF THE INVENTION

This invention relates generally to computing systems and their memory, and more particularly, to increasing system memory accessible to a processor by reclaiming memory holes in physical address space that are otherwise are not used as system memory, and by translating accesses destined for an additional range of linear addresses into the reclaimed memory holes.

BACKGROUND OF THE INVENTION

Many processors control input/output ("I/O") devices use a memory-mapped I/O scheme that enables a processor to communicate to an I/O device by reading and writing to one or more memory addresses reserved for that particular I/O device. The data and the addresses storing that data are generally characterized by the manner in which the data is cached for specific I/O devices, such as "uncacheable" memory, "prefetchable" memory "write-combined" memory, "write-through" memory, "write-back" memory, "write-protect" memory, and the like. A drawback of this approach, however, is that the memory addresses reserved for each I/O device reduces system memory available to the processor. Collectively, those reserved addresses constitute a "memory hole," which is a term commonly used to describe the address space memory that is inaccessible to a processor as a DRAM. Further, as the number of I/O devices increases, the amount of memory available to that processor as a DRAM decreases correspondingly. To illustrate the effects of memory holes on system memory, consider a 32-bit processor having access up to 4 GB of memory (i.e., an amount of memory including $2^{32}$ addresses) and being a part of a computing system having four graphics processing units ("GPUs") as I/O devices. Usually, each of these GPUs can require 512 megabytes (MB) of address space (i.e., an amount of memory including $2^{29}$ addresses) in system memory to maintain frame buffers, which would then require reserving a total amount of 2 gigabytes ("GB") of address space to cover all four GPUs. Moreover, additional system memory must be dedicated for boot code and for other I/O devices, such as audio and visual devices. Consequently, the processor of this example would have less than one-half of its system memory available to perform its computational tasks. So if reserved memory were to expand without bound, processors would be left without much system memory with which to operate.

There are several memory addressing techniques known for redirecting accesses from one range of addresses of memory to another range of addresses. Some of these techniques are used for reducing the effects of memory holes, while others are directed toward other memory management functions.

FIG. 1 illustrates one memory addressing technique used for ameliorating the effects of memory holes. In this approach, system memory 100 is increased by adding extended memory 102 to the normal amount of memory available that is useable to a processor ("useable memory") 108, which typically is about 640 kilobytes ("KB"). By adding extended memory 102, system memory 100 recovers the 384 KB of system memory usually lost to memory hole 104. In this memory addressing technique, an arithmetic operator 106 adds an amount, "delta," to a linear address ("LA") 101 to form adjusted address 103 (i.e., LA+delta), but only if address 101 is above 640 KB. Arithmetic operator 106 therefore redirects address 101 from a reserved address space in memory hole 104 to the supplemental address space in extended memory 102. While functional, adding an amount "delta" to an address is relatively cumbersome in execution and requires more hardware to implement adders than otherwise is necessary to reduce the effects of memory holes.

In another conventional memory addressing technique, a first frame buffer within a memory hole is separately remapped at a number of memory locations from a second frame buffer. By remapping the first frame buffer as an instance of memory at a relatively large distance from the second one, these two frame buffers will have more address space in which to expand without encroaching each other's addresses than if remapping is absent. As described above, this technique remaps addresses without supplementing system memory lost to memory holes. Furthermore, this technique is restricted to remapping addresses only within a memory hole. But with this technique, logical operators such as AND and OR logic functions replace addition to redirect memory accesses. By using logic gates to implement the logical operators, fewer hardware resources are required than would be necessary if adders, such as arithmetic operator 106, are used. Nonetheless, the logic gates used to implement this conventional memory technique introduces an amount of delay that is longer than otherwise is necessary.

In view of the foregoing, it would be desirable to provide a system, an apparatus and a method for minimizing the drawbacks of the above-mentioned memory addressing techniques in the reclamation of memory that otherwise would be lost to a memory hole.

SUMMARY OF THE INVENTION

A system, apparatus, and method are disclosed for increasing the physical memory size accessible to a processor, at least in part, by reclaiming physical address space typically associated with addresses of a restricted linear address space. For example, the restricted linear address space can include addresses that are otherwise unusable by the processor as system memory, such as those addresses reserved for memory-mapped devices. In one embodiment, an exemplary memory controller redirects a linear address associated with a range of addresses to access a reclaimed memory hole. The memory controller includes an address translator configured to determine an amount of restricted addresses and to establish a baseline address identified as a first number being a first integer power of 2. The range of addresses can be located at another address identified as a second number being a second integer power of 2. As such, the address translator translates the linear address into a translated address associated with the reclaimed memory hole based on the baseline address. In another embodiment, the region of memory is disposed within a system memory composed of a number of symmetrically-arranged memory devices, each of the memory devices having a memory device size that is the same as the others. In yet another embodiment, the amount of restricted addresses refers to a quantity of addresses reserved for memory-mapped devices other than the processor. As an example, the address translator can form the translated address by concatenating: a first subset of bits, a second subset of bits and a third subset of bits. The first subset of bits is from the baseline address, the second subset of bits is from an inverted linear address and the third subset of bits is from the linear address.

In another embodiment, an exemplary system translates a linear address related to a reclaimed memory hole during conversion to a row-column-bank ("RCB") address. The system comprises a processor configured to execute program instructions and to fetch program data specified by a linear address. The system also comprises a memory to store the program instructions and the program data. The memory has a physical address space of an integer power of 2 that is comprised of a number of dual in-line memory modules ("DIMMs") symmetrically arranged over one or more partitions. Each of the DIMMs has an identical size. Also, a reclaimed memory hole is located in the physical address space. Further, the system also comprises a memory controller having a memory characterizer configured to establish a baseline address for translating the linear address into a physical address associated with the reclaimed memory hole, and an address translator to form the physical address as a translated address by concatenating a portion of the baseline address with a portion of the linear address. In one embodiment, the amount of restricted addresses usually falls within a range of linear addresses dedicated to service memory-mapped devices in an address space from address 4 GB to a top of useable memory ("TOUM") address.

In yet another embodiment of the present invention, an exemplary method for reclaiming a memory hole to increase memory available to a processor is disclosed. The method comprises adding a range of addresses at a first address being a first integer power of 2. Each of the addresses in the range of addresses is translatable into a reclaimed memory hole, and the range of those addresses has a range size equivalent to a restricted address space being reserved for other than system memory (e.g., reserved for memory-mapped devices). The method continues by establishing a region of memory having a region size being any integer power of 2 at a baseline address, where the baseline address is a second integer power of 2, and by translating a linear address based on the baseline address into a translated address when the linear address is within the range of addresses. The translated address can include a first number of bits common to the baseline address. As an example, the range of addresses that are translatable into the reclaimed memory hole can be moved above a 32-bit address space (i.e., 4 GB). The baseline address is generally a second integer power of 2. In another embodiment, wherein translating the linear address further comprises appending to the first number of bits, a second number of bits indicative of a grouping to which the translated address is associated, and a third number of bits indicative of a specific address in the grouping. In one embodiment, each grouping includes a number of addresses equivalent to the size of each identically-sized memory devices.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF EXEMPLARY EMBODIMENTS

Figure 1:
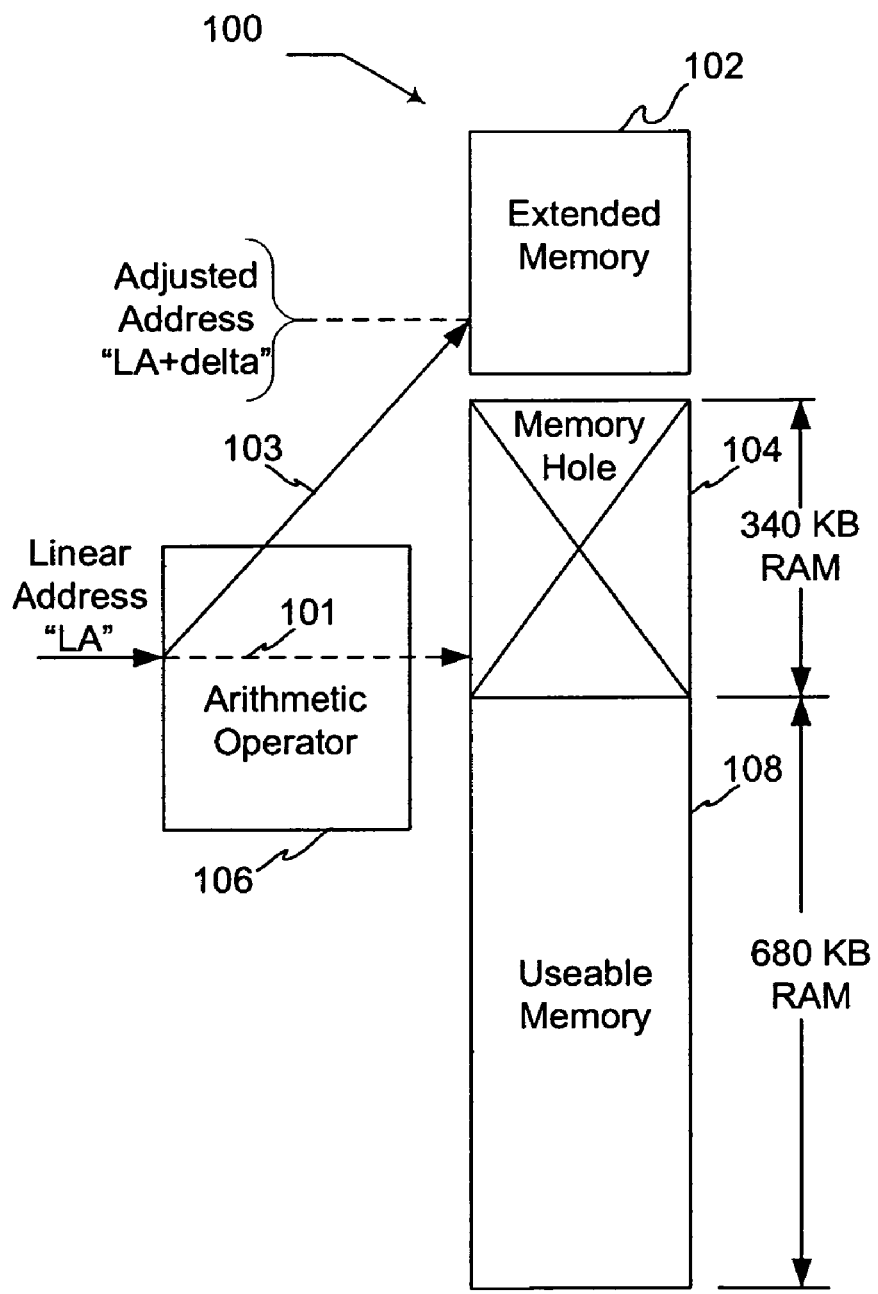
FIG. 1 illustrates a conventional memory addressing technique implemented to ameliorate the effects of memory holes.
Figure 2A:
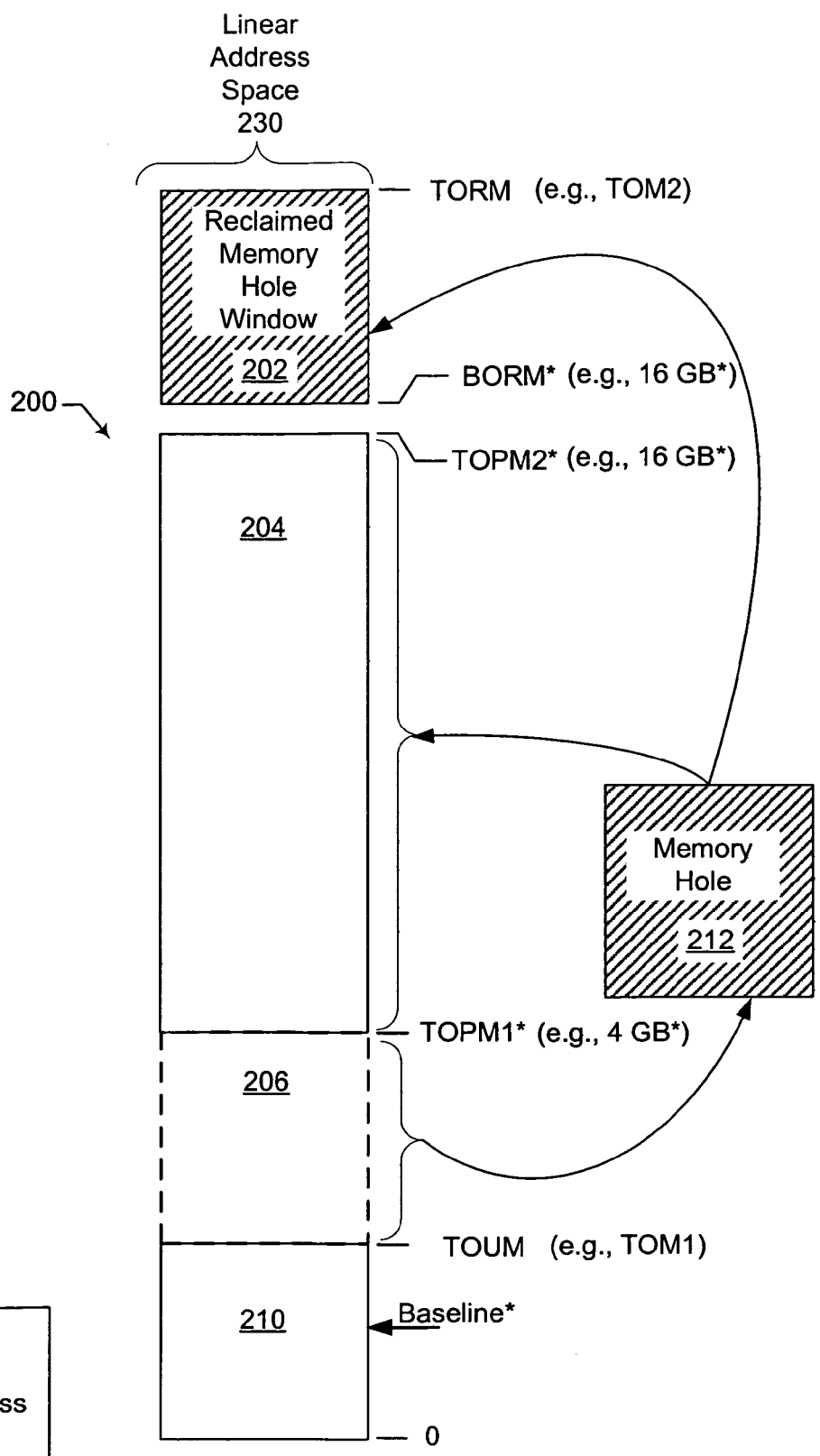
FIG. 2A is a block diagram illustrating a linear address space increased to include a range of linear addresses for a reclaimed memory hole in accordance with a specific embodiment of the present invention.

FIG. 2A is a block diagram illustrating an exemplary linear address space increased to include a range of linear addresses for a reclaimed memory hole in accordance with a specific embodiment of the present invention. In the example shown, a linear address space 200 is composed of several address spaces that are each addressable by a processor. Address space 210 includes addresses that are unrestricted in their use as system memory, with these addresses being identified from address 0 to an address TOUM−1 (not shown). Address TOUM−1 is one less than the address identified as a first "top of useable memory" ("TOUM"). Further, linear address space 200 can include optional address space 204, which contains additional unrestricted (i.e., accessible) addresses for use as system memory. The addresses in address space 204 extend from address "top of physical memory" ("TOPM1") to an address TOPM2−1 (not shown), where TOPM2 is a second "top of physical memory." Note that TOPM1 is associated with a physical address at or near the bottom of address space 254 of FIG. 2B and TOPM2−1 is associated with the highest physical address of physical address space 250. By contrast, address space 206 is a portion of linear address space 200 that typically is reserved for accessing memory-mapped I/O devices. As such, linear addresses of address space 206 are typically restricted (i.e., inaccessible) from being used as system memory by a processor. Address space 206 extends from address TOUM to an address TOPM1−1 (not shown), which is one less than the address identified as TOPM1.

In a specific embodiment of the present invention, address TOUM is identifiable as a first "top of memory," or TOM1, which varies as address space 206 grows toward address 0 when I/O devices are added to a computing system in which the processor resides. Address TOPM1 is a physical address corresponding to the highest physical address below which I/O devices are placed. In one exemplary configuration, address TOPM1 is set to identify an address corresponding to 4 GB and address TOPM2 is set to identify an address corresponding to 16 GB. In addition, address spaces 204, 206 and 210 are translatable into similarly-sized dual in-line memory modules ("DIMMs"), each similarly-sized DIMM having, for example, identical sizes of memory.

Figure 2B:
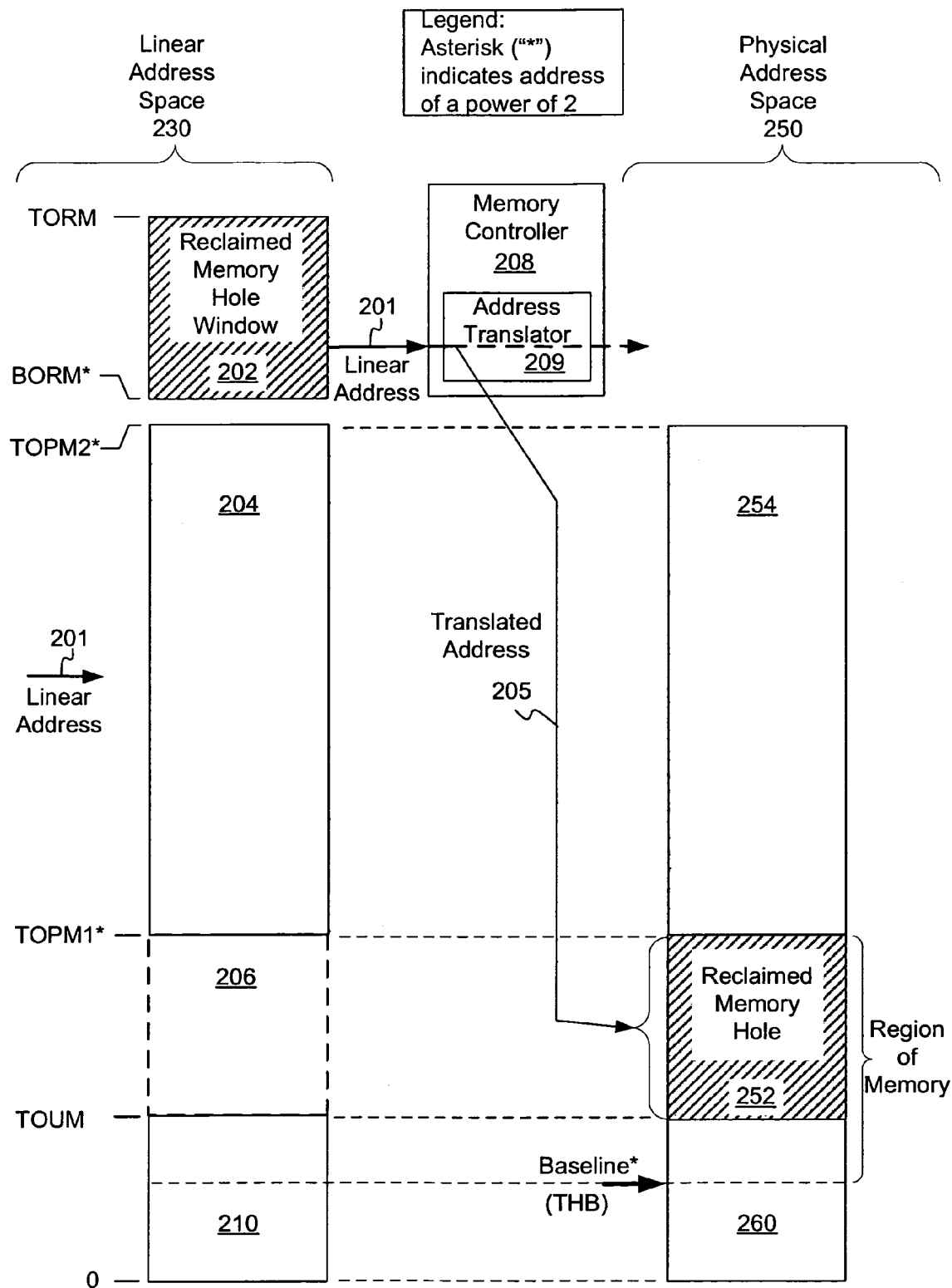
FIG. 2B is a block diagram illustrating a memory controller for translating linear addresses within the range of linear addresses shown in FIG. 2A into physical addresses constituting the reclaimed memory hole in accordance with a specific embodiment of the present invention.

According to one embodiment of the present invention, an amount of linear addresses equivalent to the size of memory hole 212 is added as a range of addresses beyond linear address space 200 to form an enlarged linear address space 230. This range of addresses is shown as reclaimed memory hole window 202 and extends, for example, from an address identified as the "bottom of reclaimed memory," or BORM, to an address identified as the "top of reclaimed memory," or TORM. As is shown in FIG. 2B, reclaimed memory hole window 202 is typically located within the linear addressing capabilities of the processor, but above physical address space 250. Note that in most cases, addresses BORM and TOPM2 are collocated at the same address, such as 16 GB. As used herein, the term "linear address" refers to any address that is addressable (i.e., useable) by a processor, with each linear address generally relate to a physical address. A "physical address" is a hardware memory location, for example, in a DRAM memory device. As such, a "physical address space" defines the size of one or more DRAM memory devices such that a "DRAM size" is the capacity of at least one memory device constituting physical address space 250. For example, physical address space 250 can have a size of 16 GB of DRAM memory (i.e., an amount of memory including $2^{34}$ addresses), with address TOPM2 being a 36-bit address.

FIG. 2B is a block diagram illustrating a memory controller for translating any linear address 201 of the range linear addresses of FIG. 2A into physical addresses constituting a reclaimed memory hole in accordance with a specific embodiment of the present invention. In particular, FIG. 2B illustrates an enlarged linear address space 230 that, at least in part, maps into a physical address space 250, which is generally embodied in physical memory (e.g., dynamic random access memory, or DRAM). Generally, address spaces 204 and 206 of linear address space 230 map into address spaces 254 and 260 of physical address space 250, respectively, whereas address space 206 includes linear addresses that are used for other purposes than accessing the physical addresses associated with address space 252. To reclaim the physical addresses of address space 252, linear addresses falling within reclaimed memory hole window 202 are redirected by memory controller 208 into address space 252, thereby increasing system memory available to a processor without adding additional memory devices to effectuate the increase.

In a specific embodiment, memory controller 208 is configured to redirect a linear address 201 destined for reclaimed memory hole window 202 into address space 252. Memory controller 208 includes an address translator 209 for translating a linear address ("LA") 201 into a translated address 205 when that linear address is associated with an address in reclaimed memory hole window 202. To effectuate address translation, memory controller 208 determines a baseline address (or translated hole base) from a translated hole size for memory hole 212 of FIG. 2A (i.e., addresses in address space 206). The baseline address and the translated hole size are identified by numbers that are integer powers of two ("2"). An integer power of 2 can be expressed as "$2^N$," where N is an integer (e.g., . . . , 0, +1, +2, . . . ). By leveraging the nature of the integer powers of 2, address translator 209 performs address translation without implementing adders or other types of arithmetic units, thereby reducing the amount of hardware required to reclaim memory and speeding the rate of translation (e.g., the translation of linear addresses into physical addresses having a format of row-column-bank ("RCB") addresses). In a specific embodiment, memory controller 208 determines the baseline address ("Baseline") as a second boundary of address space 206 that is an integer power of two (i.e., $2^N$). The first boundary is address TOPM1, which is another integer power of two ("2"). The significance of using boundaries set at integer powers of 2 will be discussed below.

In a specific embodiment of the present invention, address translator 208 uses the baseline address to translate addresses by concatenating subsets of bits, whereby translated address 205 includes at least one subset of bits that is used directly from linear address 201. It is possible to implement concatenation to form translated address 205 because the system memory, according to an embodiment of the present invention, is composed of identically-sized memory devices. By using concatenation, the amount of hardware required for address translation is reduced because the number of bits of linear address 201 requiring translation is decreased. Furthermore, the reduction in the amount of hardware also minimizes the delay time in forming translated address 205. In some cases, most of the bits that form translated address 205 do not need either arithmetic and/or logical operations performed on those bits. In another specific embodiment of the present invention, an exemplary address translator 209 performs logical operations on binary representations of the baseline address, the translated hole size and an inverted linear address 201, where both the baseline address and the translated hole size are identified by numbers that are integer powers of 2. By performing logical operations using AND gates and OR gates, for example, hardware and time delays are minimized compared to the implementation of adders.

Figure 3:
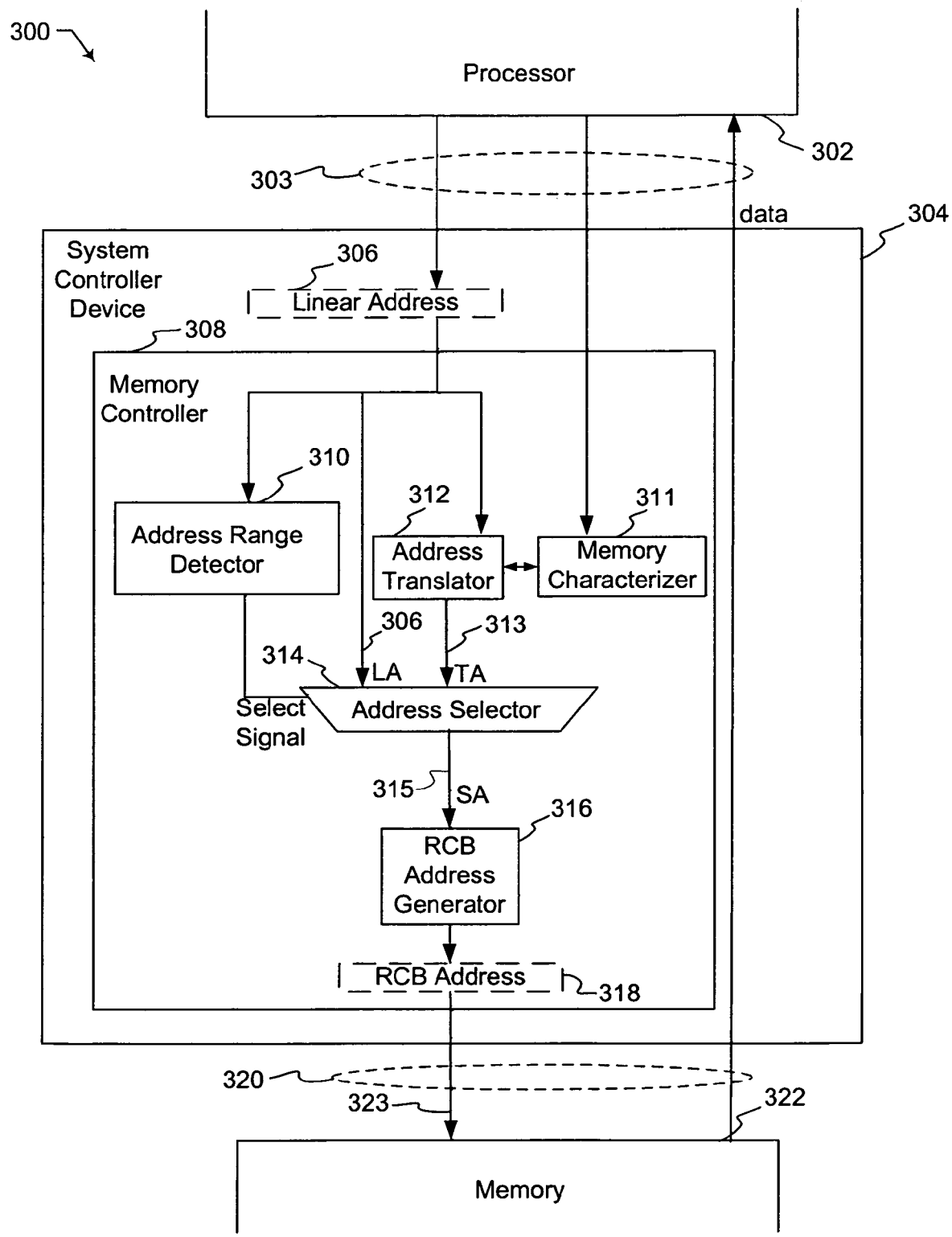
FIG. 3 is a block diagram illustrating a system that includes a memory controller for at least translating a linear address destined to access a reclaimed memory hole into a translated address for accessing an address space from which the memory hole was displaced, according to a specific embodiment of the present invention.

FIG. 3 is a block diagram illustrating a system 300 that includes a memory controller 308 for at least translating a linear address ("LA") 201 destined to access a reclaimed memory hole 252 into a translated address 205. Translated address 205 enables a processor to access address space 252 that typically is associated with linear addresses of restricted address space 206, according to a specific embodiment of the present invention. In this example, memory controller 308 is disposed within a system controller device 304 that, in whole or in part, either constitutes a Northbridge "chip" or "chip set," or has an equivalent functionality as a Northbridge device. In particular, device 304 at least controls interactions among processor 302, memory 322, and I/O devices (not shown), such as those devices associated with an Accelerated Graphics Port ("AGP") or a local Peripheral Component Interconnect ("PCI") bus. As such, device 304 is communicatively coupled over at least one bus, such as front side bus 303, to at least one processor 302 and to any number of I/O devices, which can include one or more graphics processing units ("GPUs") (not shown). In some instances, device 304 is communicatively coupled via memory bus 323 to memory 322. During execution of its program instructions, processor 302 provides a linear address 306 to memory controller 308 as part of a processor request requiring access to data in memory 322. In some cases, memory 322 represents a physical memory providing for physical address space 250. As some I/O devices are associated with PCI buses, memory hole 212 (as well as the range of restricted addresses constituting address space 206) can be referred to as a "PCI memory hole" in such instances.

Memory controller 308 includes an address range detector 310, a memory characterizer 311, an address translator 312, and an address selector 314. Address range detector 310 is configured to receive linear addresses for accessing memory 322, such as linear address 306, and to determine whether each linear address falls within reclaimed memory hole window 202 as defined by addresses BORM and TORM. In one embodiment, address range detector 310 operates as follows. First, address range detector 310 determines whether linear address 306 ("LA") is within the range from address 0 to address TORM, exclusive of address space 206. If linear address 306 is outside this range, then address range detector invalidates that address. Otherwise, address range detector 310 will then determine whether linear address 306 falls within addresses BORM and TORM and then will communicate the results of this determination to address selector 314. So if linear address 306 does not fall within addresses BORM and TORM (i.e., does not fall within the reclaimed memory hole window 202), then address selector 314 selects linear address 306 as selected address 315. But if linear address 306 does fall within reclaimed memory hole window 202, then address selector 314 selects a translated address 313, which is outputted from address translator 312.

In a specific embodiment, address range detector 310 determines whether linear address 306 ("LA") is within the range from address 0 to address TORM in accordance with Equation 1 as follows.

$$\text{In Range} = LA < TOUM \text{ OR } [(LA \geq TOPM1) \text{ AND } (LA < TORM)] \qquad \text{Equation 1}$$

A true result for "In Range" indicates that LA 306 does fall within the range. So if LA 306 is either in address space 210 (i.e., <TOUM) or in a collective address space that includes address space 204 and reclaimed memory hole window 202 (i.e., addresses above or at address TOPM1 and below address TORM), then address range detector 310 tests whether LA 306 is destined for reclaimed memory hole window 202, and thus, reclaimed memory hole 252. Equation 2 exemplifies this test as follows.

$$\text{In Reclaimed Memory Hole} = \text{MASK} \| LA[\text{bit MAX:bit } N] \qquad \text{Equation 2}$$

A true result for "In Reclaimed Memory Hole" indicates that LA 306 falls within reclaimed memory hole window 202, where MASK is a set of bits configured to detect when LA 306 is above address BORM and LA[bit MAX:bit M] selects a subset of bits of LA 306 to test against MASK. For example, a mask of "1000," where the logical 1 of the mask is designed to be logically OR'ed against bit 34 of linear address 306 (i.e., bit MAX) to test whether LA 306 is above address BORM, which in this example is at 16 GB. The value N (for bit N) can be determined periodically or at processor initialization, and represents the number of a bit position, from the least significant bit, as determined by Equation 3.

$$N = \log 2[\text{MEMORY DEVICE size}], \qquad \text{Equation 3}$$

where "DRAM size" is the capacity of at least one memory device constituting physical address space 250. Note that with address range detector in parallel with address translator 312, delay in address translation (as well as conversion to RCB address format) is minimized. As such, address translation can be implemented without introducing delay into RCB decoding.

Memory characterizer 311 is configured to receive information characterizing physical address space 250. For example, memory characterizer 311 receives from processor 302 a value either representing the size of memory hole 212 or address TOUM. Also, memory characterizer 311 can receive any other value representing another measure for determining the capacity (i.e., the amount of restricted addresses in address space 206) of memory hole 212. By having information regarding address TOUM, memory characterizer 311 can calculate the size of memory hole 212. For example, the difference between address TOPM1 and address TOUM is a number of addresses equivalent to the size of memory hole 212.

Memory characterizer 311 is also configured to determine a translated hole size ("THS") for memory hole 212, THS being the capacity of a region of memory bounded by address TOPM1 and by the baseline address, both of which are integer powers of 2. In some cases, THS can be determined as a next integer power of 2 rounded up from the size of memory hole 212. For example, if the size of memory hole 212 were to be 1.75 GB, which cannot be represented by a value that is an integer power of 2 (i.e., 1.75 GB is between $2^{30}$ and $2^{31}$), then the THS for memory hole 212 would be set to 2 GB (i.e., $2^{31}$).

Once memory characterizer 311 determines THS for memory hole 212, then it can establish a baseline address ("Baseline") as a translated hole base ("THB"). Address translator 312 uses this THB as the baseline address to form translated addresses 313 (i.e., a physical address associated with reclaimed memory hole 252) from linear addresses 306. In one specific embodiment, memory characterizer 311 establishes THB as the difference between address TOPM1 and the number of addresses constituting THS. So if TOPM1 is at 4 GB (i.e., address $2^{32}$) and if THS includes $2^{31}$ addresses (i.e., 2 GB), then THB will be set at 2 GB. As such, the baseline address will be set at an address corresponding to $2^{31}$.

In another specific embodiment, memory characterizer 311 determines a subset of bits for THB rather than operating upon each bit of the baseline address. This subset of bits ranges from bit MAX to bit N and is designated as "THB[MAX:N]," where MAX is the most significant bit necessary to identify either address TOPM1 or address TOPM2, whichever is the maximum address of physical address space 250. Equation 4 determines "N" as follows.

$$N = \log 2[\text{THS}], \qquad \text{Equation 4}$$

where "N" is a number of bits for describing the region of memory sized as THS. Memory characterizer 311 can determine bit MAX and N periodically, when necessary. Or, it can receive the value of bit MAX and determine the value of N at or shortly after processor initialization, while maintaining these values for use by address translator 312 thereafter. Similarly, memory characterizer 311 can receive information about a value MIN (e.g., from processor 302) that represents the minimum granularity of physical address space 250. In a specific embodiment, the value MIN represents the most significant bit necessary to identify the capacity (i.e., size) of each similarly-sized memory device (e.g., a DIMM composed of DRAM or the like) used to form memory 322. For example, if each DIMM is sized at 128 MB (i.e., $2^{27}$ addresses), then 27 bits are necessary to access each address in the 128 MB address space. Hence, the value of MIN is 27 and bit MIN is the $27^{th}$ bit (e.g., from the least significant bit, in most cases).

Address translator 312 is configured to translate a linear address ("LA") 306 destined to access reclaimed memory hole window 202 into a translated address 315 for accessing the reclaimed memory hole in address space 252. In one embodiment, address translator 312 is configured to receive THS and THB from memory characterizer 311 and is further configured to invert bits of linear-address 306. Then, address translator 312 translates linear address ("LA") 306 into translated address ("TA") 315 in accordance with Equation 5.

$$TA = [THB] \text{ OR } [(THS-1) \text{ AND } (\sim LA)] \qquad \text{Equation 5}$$

where "~LA" represents bits of an inverted linear address 306, and binary numbers THB and THS represent bits for describing the translated hole base and the translated hole size, respectively.

In another embodiment, address translator 312 is configured to receive one or more of the following as determined by memory characterizer 311: THS, THB, MAX, N, and MIN. In some cases, address translator 312 is configured to receive THS, THB[MAX:N], and N. Regardless, address translator 312 can be configured to invert a subset of bits of linear address 306. In particular, address translator 312 inverts bits LA[N−1:MIN] to form inverted bits ~LA[N−1:MIN]. Then, address translator 312 translates linear address 306 into TA 315 by concatenating bits THB[MAX:N] with bits ~LA[N−1:MIN], with the result being again concatenated with another subset of bits from LA 306 (i.e., bits "LA[MIN−1:0]"). Equation 6 describes address translation as follows.

$$TA = \{THB[MAX,N]\}: \{\sim LA[N-1,MIN]\}: \{LA[MIN, 0]\} \qquad \text{Equation 6}$$

Translated address 313 then is output to address selector 314.

As described above, if linear address 306 does not fall within addresses BORM and TORM (i.e., does not fall within the reclaimed memory hole window 202), then address selector 314 selects linear address 306 (i.e., an untranslated address) as selected address ("SA") 315. Then, the untranslated linear address 306 is used to access a corresponding physical address. But if linear address 306 does fall within reclaimed memory hole window 202 (FIG. 2B), then address selector 314 selects a translated address ("TA") 313. Regardless whether SA 315 is LA 306 or TA 313, selected address ("SA") 315 then is provided to optional row-column-bank ("RCB") address generator 316, which then can convert selected address 315 into an RCB-formatted address, such as RCB address 318, for accessing memory 322. Note that RCB address 318 can have its row, column and bank bits arranged in any order (e.g., from most to least significant bit: row bits, bank bits, column bits).

In one embodiment of the present invention, address translator 312 can include functionalities of other components of memory controller 308, such as including the functions of memory characterizer 311. As such, address translator 312 can be configured to determine an amount of restricted addresses that is unusable (or inaccessible) by processor 302 as system memory (e.g., used for memory-mapped devices) and to establish a baseline address, such as THB, as a first integer power of 2 for a region of memory.

Figure 4:
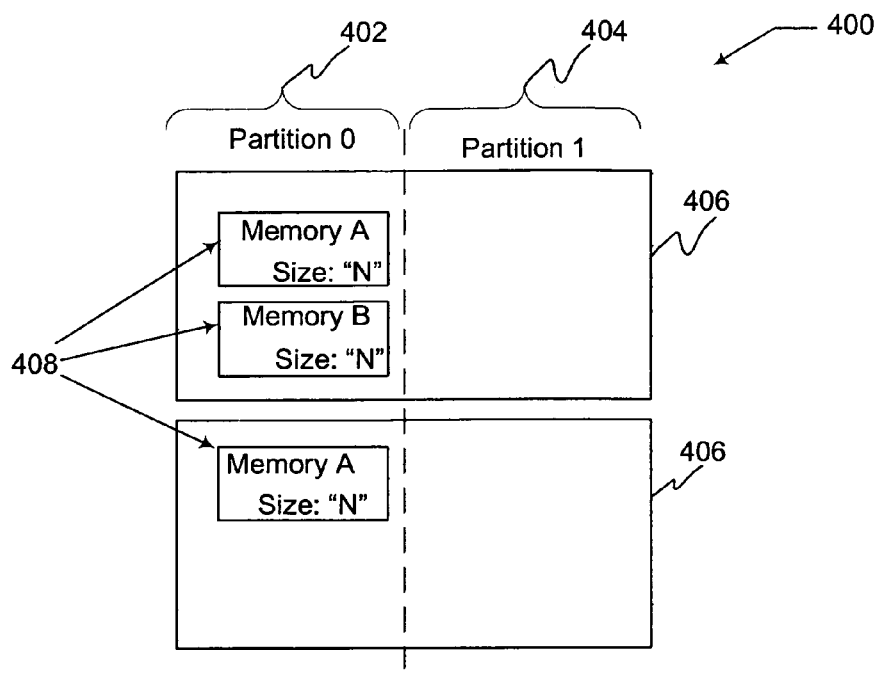
FIGS. 4 and 5 illustrate specific configurations and compositions of a memory, according to any number of embodiments of the present invention.
Figure 5:
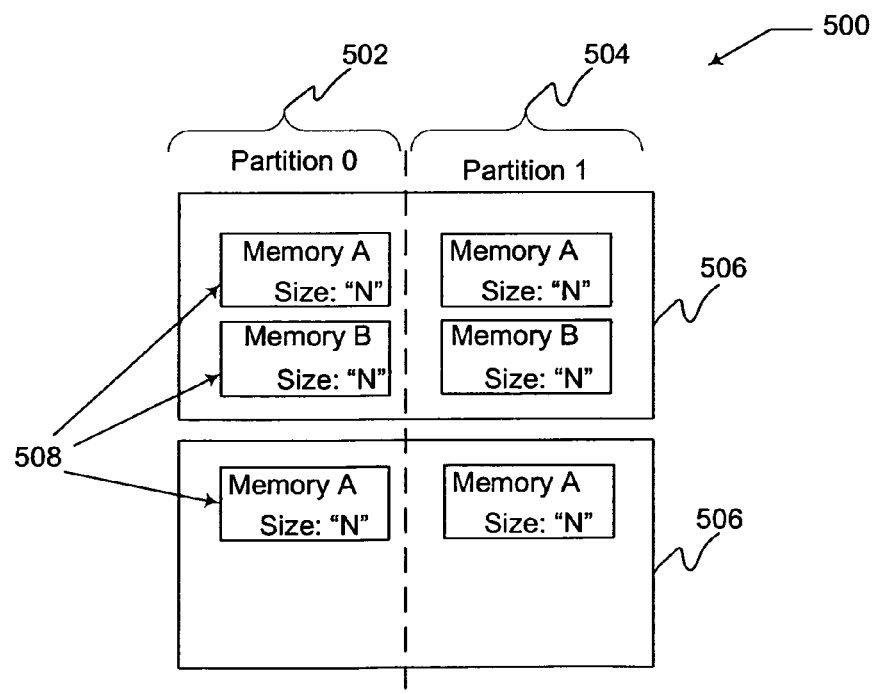

FIGS. 4 and 5 illustrate specific configurations of memory 322, according to any number of embodiments of the present invention. FIG. 4 shows that memory 400 can be a symmetric, single-partitioned memory extending over symmetric memory configurations. In particular, all memory devices 408, which can be DIMMs, reside in only one partition—either partition zero ("0") 402 or partition one ("1") 404 (each partition can be an independent memory system). Further, each memory device 408 has an identical (i.e., symmetric) amount of capacity, such as size "N," as shown.

FIG. 5 shows that memory 500 can be a symmetric, balanced-partitioned memory extending over any number of symmetric memory configurations. In particular, each of memory devices 508 has an identical amount of capacity, such as size "N," as shown. Further, memory 500 is described as "balanced" because the amount of total memory in partition zero ("0") 502 is the same as in partition one ("1") 504. By symmetrically arranging similarly-sized memory devices as described in FIGS. 4 and 5, addresses TOUM and BORM can be selected to be integer powers of 2. With address TOPM1 generally being an integer power of 2, the size of the region of memory between addresses TOUM and BORM can be sized as THS, which also is of an integer power of 2. By leveraging the nature of the integer powers of 2, address translator 312 can translate addresses without performing either arithmetic and/or logical operations on each bit of linear address 306 or of THB. This preserves resources as well as minimizes introduction of delays into both the translation and RCB decoding process.

Figure 6A:
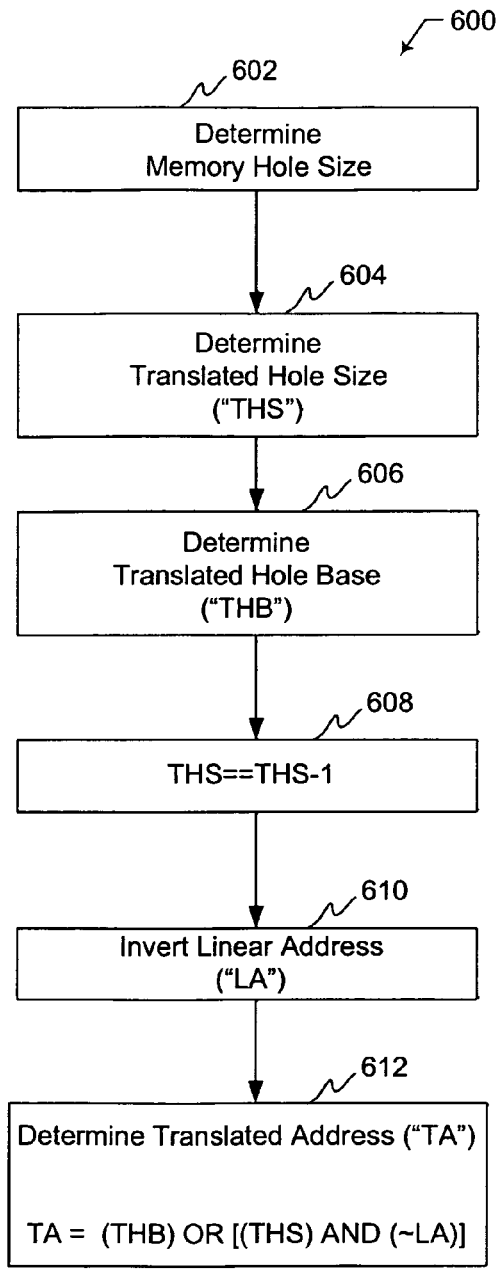
FIGS. 6A and 6B depict exemplary flow diagrams for specific embodiments of the present invention.

FIG. 6A depicts an exemplary flow diagram for a specific embodiment of the present invention. At 602, the size of the memory hole is determined by, for example, retrieving this information from a TOM1 register in a processor. At 604, the translated hole size, THS, is determined by, for example, rounding up to the next integer power of 2. At 606, the translated hole base, THB, is determined. Next at 608, THS is adjusted by subtracting the value of one from the original THS. Then at 610, the linear address for accessing memory is inverted to form an inverted address. At 612, the linear address is translated in accordance with Equation 5.

Figure 6B:
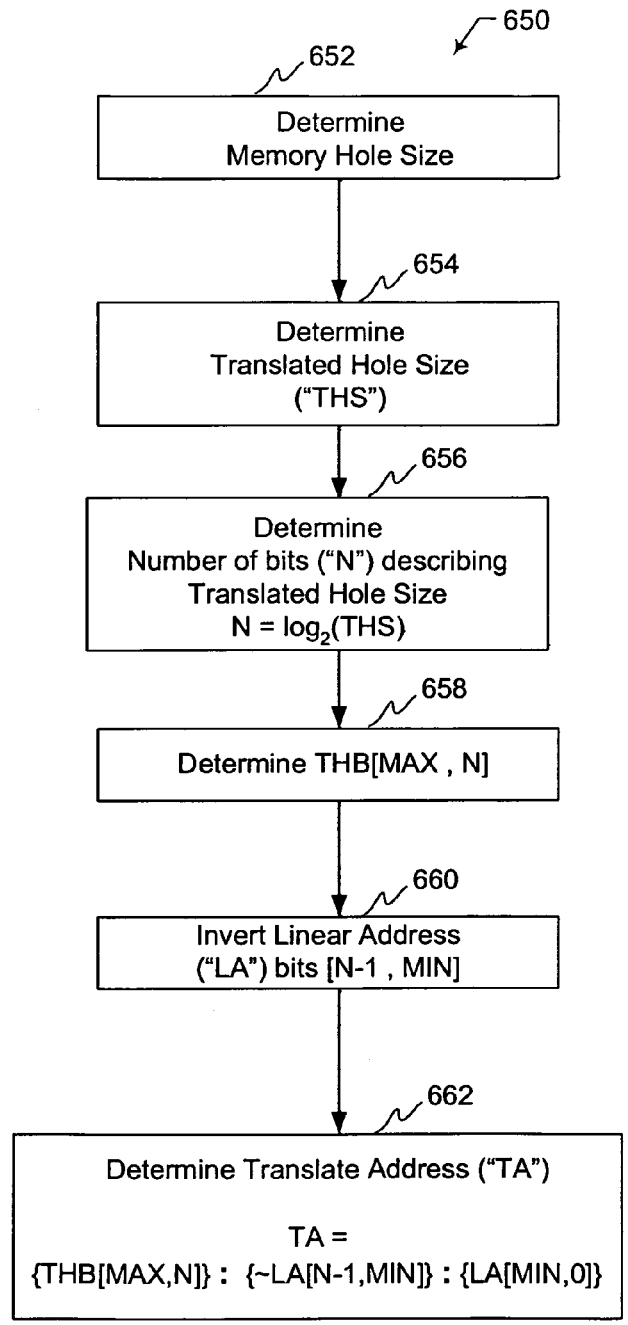

FIG. 6B depicts another exemplary flow diagram for another specific embodiment of the present invention. At 652, the size of the memory hole is determined. At 654, the translated hole size, THS, is determined. At 656, the number of bits describing translated hole size, THS, is determined. Next at 658, a subset of bits for THS (e.g., from bit MAX to bit N) is determined as shown in Equation 4. Then at 660, another subset of bits from the linear address is inverted to form an inverted subset of bits for the linear address. At 662, the linear address is translated in accordance with Equation 6.

Figure 7:
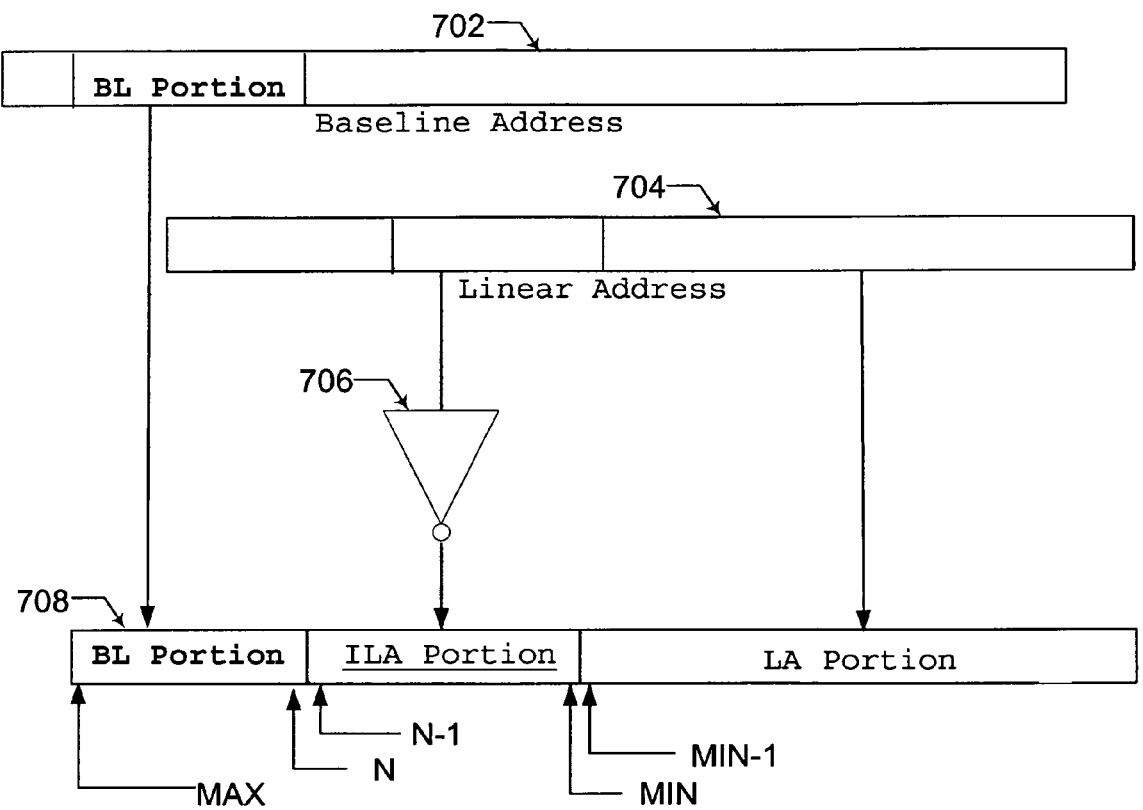
FIG. 7 illustrates the formation of a translated address, according to one embodiment of the present invention.

FIG. 7 illustrates the formation of a translated address, according to one embodiment of the present invention. Address translator 312 forms translated address 708 by selecting portions of baseline address 702 and linear address 704 and concatenating those portions. A baseline portion ("BL Portion") is selected from baseline address 702 to form a BL portion from bit MAX to bit N of translated address 708. A first portion of linear address 704 is inverted by inverter 706, which symbolically represents the inversion of any number of bits. The inverted bits from the first portion forms the inverted linear address ("ILA") portion from bit N−1 to bit MIN. A second portion of linear address 704 forms the linear address ("LA") portion of translated address 708, which includes bits MIN−1 to some lower bit number (e.g., bit 0 or any other bit) of linear address 704. Note that if linear address 704 does not fall within a range of addresses associated with a reclaimed memory hole, then translated address 708 is not formed for that linear address.

Figure 8:
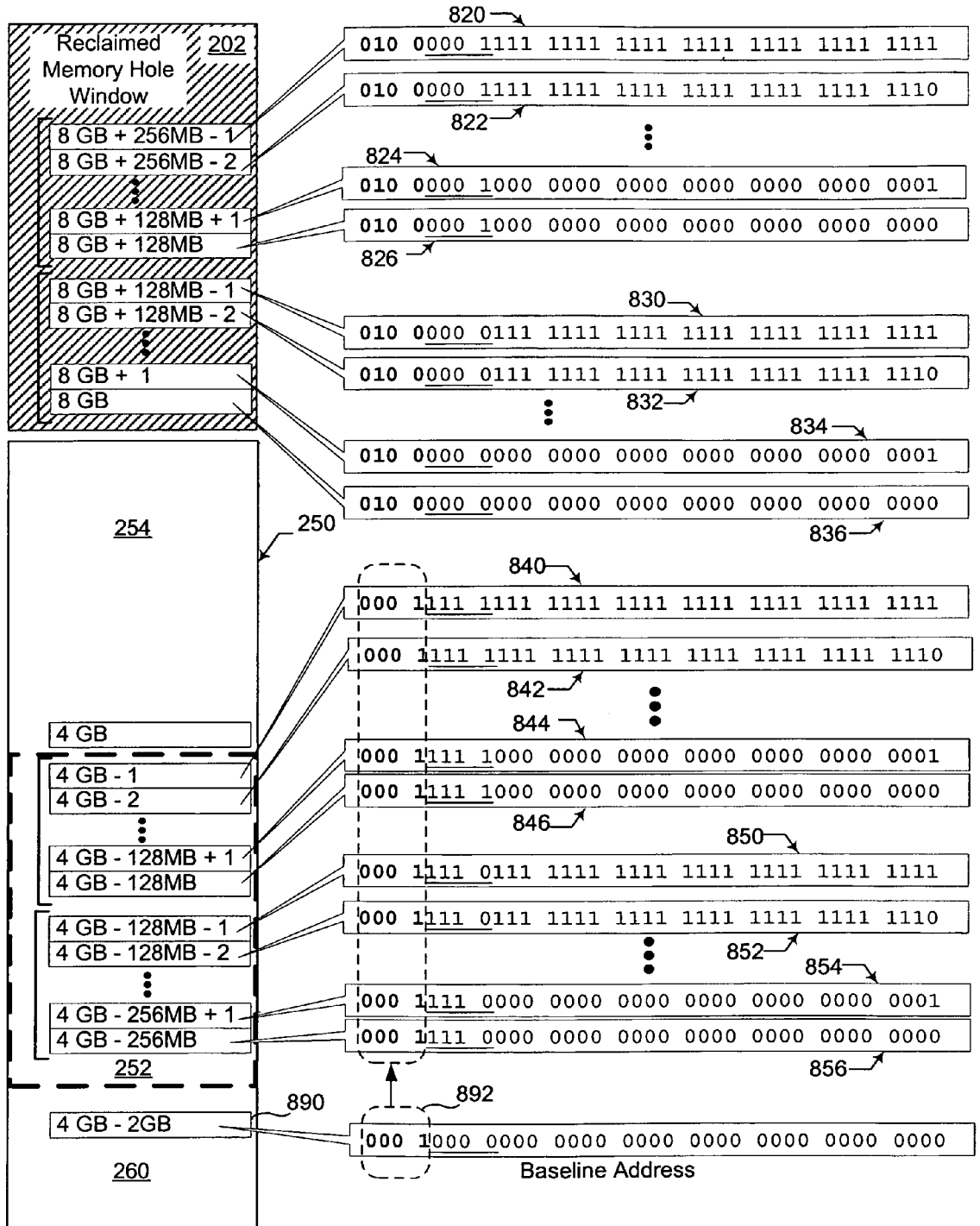
FIG. 8 illustrates an example of address translation in accordance with a specific embodiment of the present invention.

FIG. 8 illustrates an example of address translation, according to one embodiment of the present invention. In this example, reclaimed memory hole window 202 is disposed somewhere above the physical addresses associated with address space 250, which includes useable memory address spaces 250 and 254 of FIG. 2B, as well as an address space 252 containing the reclaimed memory hole. Here, consider that baseline address 890, or THB, is set to 2 GB (i.e., 4 GB−2 GB), address TOPM1 is 4 GB and address BORM is 8 GB (i.e., address $2^{33}$). Baseline address 890 includes a baseline portion 892 that is a subset of bits that describes the region of memory (e.g., from THB to TOPM1) with which an exemplary memory controller redirects processor accesses. Also, consider that the capacity of each similarly-sized memory device is 128 MB, which is an integer power of 2 that defines bit MIN.

Consider that a processor attempts to access addresses in reclaimed memory hole window 202 in a sequential fashion, from address 8 GB to address 8 GB+128 MB, and then up through address 8 GB+256 MB. According to one embodiment, address translator 312 redirects accesses to address ("8 GB") 836 to translated address ("4 GB−128 MB") 846. To illustrate, a first subset of bits, 0001, for translated address 846 is determined from baseline portion 892, a second subset of bits, 1111, is formed by inverting bits 0000 of address 836. Address translator 312 then concatenates bits 0000 with bits 0001. Next, a third subset of bits is formed by using the remainder of linear address bits from address 836. Address translator 312 concatenates those remaining bits with bits "00011111." Similarly, address translator 312 translates addresses ("8 GB+1") 834, . . . , ("8 GB+128 MB−2") 832, and ("8 GB+128 MB−1") 830 into translated address ("4 GB−128 MB+1") 844, . . . , ("4 GB−2") 842 and ("4 GB−1") 840, respectively.

Note that as accesses to reclaimed memory hole window 202 cross over an address of an integer power of 2 that corresponds to a multiple of the size of a constituent memory device, translations to address space 206 drop to an address that is 128 MB lower than the initial translated address 846. So when an access to reclaimed memory hole window 202 crosses over to address ("8 GB+128 MB") 826, this address translates to address ("4 GB−256 MB") 856, which is 128 MB below address 846. Thereafter, address translator 312 translates addresses ("8 GB+128 MB+1") 824, . . . , ("8 GB+256 MB−2") 822, and ("8 GB+256 MB−1") 820 into translated address ("4 GB−256 MB+1") 854, . . . , ("4 GB−128 MB−2") 852 and ("4 GB−128 MB−1") 850, respectively. As described above, baseline portion 892 defines a portion of memory to which accesses to reclaimed memory hole window 202 will be directed. The ILA portion of translated address 708 of FIG. 7 determines to which grouping of translated addresses that an access to reclaimed memory hole window 202 will be directed, where the grouping is set by the size of each similarly-sized memory device. The LA portion of linear address 704 then determines to which specific translated address relates to the access.

An embodiment of the present invention relates to a computer-readable medium having computer code thereon for performing various computer-implemented operations. In particular, control strategies of the invention may be implemented in software associated with a processor. The media and computer code may be those specially designed and constructed for the purposes of the present invention, or they may be of the kind well known and available to those having skill in the computer software arts. Examples of computer-readable media include hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. In fact, this description should not be read to limit any feature or aspect of the present invention to any embodiment; rather features and aspects of one embodiment may readily be interchanged with other embodiments. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A memory controller for redirecting a linear address associated with a range of addresses to access a reclaimed memory hole comprising:
    an address translator configured to determine an amount of restricted addresses that are unusable by a processor as system memory and to establish a baseline address identified as a first number being a first integer power of 2 for defining a region of memory, said range of addresses being located at another address identified as a second number being a second integer power of 2,
    wherein said address translator translates said linear address into a translated address associated with said reclaimed memory hole based on said baseline address;
    wherein said region of memory is disposed within a main memory composed of a number of symmetrically-arranged memory devices, each of said memory devices having a memory device size that is the same as the others;
    said amount of restricted addresses referring to a quantity of addresses reserved for memory-mapped devices other than said processor and said region is bounded by a top of physical memory ("TOPM") address identified as a third number being a third integer power of 2;
    said address translator forming said translated address by concatenating subsets of bits; and
    wherein said address translator forms said translated address by concatenating: a first subset of bits, a second subset of bits and a third subset of bits, said first subset of bits being from said baseline address, said second subset of bits being from an inverted linear address and said third subset of bits being from said linear address.

2. The memory controller of claim 1 wherein concatenating said subsets of bits reduces an amount of hardware by using bits from said linear address as at least one of said subsets for said translated address, said translated address being configured to access a range of physical addresses constituting said reclaimed memory hole.

3. The memory controller of claim 1 further comprising a memory characterizer to establish said baseline address by determining a next number of addresses identified as being a next integer power of 2, where said next number of addresses is greater than said amount of restricted addresses and by setting said baseline address at said next number of addresses lower than said TOPM address, wherein said memory characterizer further determines a maximum number of bits ("MAX") to identify said TOPM address and a minimum number of bits ("MIN") to identify said memory device size.

4. The memory controller of claim 1, wherein said memory controller is part of a system including a memory having program instructions and program data, the memory having a physical address space of an integer power of 2 and comprised of a number of dual in-line memory modules ("DIMMs") symmetrically arranged over one or more partitions, said DIMMs having an identical size, and the reclaimed memory hole in said physical address space.

5. A memory controller for redirecting a linear address associated with a range of addresses to access a reclaimed memory hole comprising:
   an address translator configured to determine an amount of restricted addresses that are unusable by a processor as system memory and to establish a baseline address identified as a first number being a first integer power of 2 for defining a region of memory, said range of addresses being located at another address identified as a second number being a second integer power of 2, wherein said address translator translates said linear address into a translated address associated with said reclaimed memory hole based on said baseline address;
   wherein said region of memory is disposed within a main memory composed of a number of symmetrically-arranged memory devices, each of said memory devices having a memory device size that is the same as the others;
   said amount of restricted addresses referring to a quantity of addresses reserved for memory-mapped devices other than said processor and said region is bounded by a top of physical memory ("TOPM") address identified as a third number being a third integer power of 2;
   said address translator forming said translated address by concatenating subsets of bits; and
   a memory characterizer to establish said baseline address by determining a next number of addresses identified as being a next integer power of 2, where said next number of addresses is greater than said amount of restricted addresses and by setting said baseline address at said next number of addresses lower than said TOPM address, wherein said memory characterizer further determines a maximum number of bits ("MAX") to identify said TOPM address and a minimum number of bits ("MIN") to identify said memory device size.

6. The memory controller of claim 5 wherein said memory characterizer is further configured to determine a number "N" of bits to identify said region of memory, said number N being derived as follows:

$$N = \log_2(R),$$

where R represents the number of addresses constituting the size of said region of memory.

7. The memory controller of claim 6 wherein said first subset of bits include bits from bit MAX to bit N of said baseline address, said second subset of bits include bits from bit N−1 to bit MIN of said inverted linear address, and third subset of bits include bits from bit MIN−1 to a lower bit of said linear address.

8. The memory controller of claim 7 further comprising:
   an address detector configured to detect that said linear address is within said range of addresses for said reclaimed memory hole;
   an address selector for selecting said translated address; and
   a row-column-bank ("RCB") address generator configured to convert said translated address into an RCB address.

9. The memory controller of claim 8 wherein said number of memory devices constitute one or more dual in-line memory modules ("DIMMs"), said restricted addresses are associated with a number of frame buffers, said memory-mapped devices include any number of graphics processing units ("GPUs"), said third integer power of 2 address being 32 bits, and said amount of restricted addresses constitutes a peripheral component interconnect ("PCI") memory hole.

10. The memory controller of claim 6 wherein concatenating said subsets of bits reduces an amount of hardware by using bits from said linear address as at least one of said subsets for said translated address, said translated address being configured to access a range of physical addresses constituting said reclaimed memory hole.

11. The memory controller of claim 5, wherein said memory controller is part of a system including a memory having program instructions and program data, the memory having a physical address space of an integer power of 2 and comprised of a number of dual in-line memory modules ("DIMMs") symmetrically arranged over one or more partitions, said DIMMs having an identical size, and the reclaimed memory hole in said physical address space.

12. A memory controller for redirecting a linear address associated with a range of addresses to access a reclaimed memory hole comprising:
   an address translator configured to determine an amount of restricted addresses that are unusable by a processor as system memory and to establish a baseline address identified as a first number being a first integer power of 2 for defining a region of memory, said range of addresses being located at another address identified as a second number being a second integer power of 2, wherein said address translator translates said linear address into a translated address associated with said reclaimed memo hole based on said baseline address;
   wherein said region of memory is disposed within a main memory composed of a number of symmetrically-arranged memory devices, each of said memory devices having a memory device size that is the same as the others;
   said amount of restricted addresses referring to a quantity of addresses reserved for memory-mapped devices other than said processor and said region is bounded by a top of physical memory ("TOPM") address identified as a third number being a third integer power of 2;
   wherein said address translator comprises:
      logic AND gates configured to logically AND a first number of bits representing a translated hole size ("THS") with a second number of bits representing an inverted linear address ("~LA") to form a first result; and
      logic OR gates configured to logically OR said result with a third number of bits representing said baseline address.

13. The memory controller of claim 12 further comprising a memory characterizer to establish said baseline address by determining a next number of addresses identified as being a next integer power of 2, where said next number of addresses is greater than said amount of restricted addresses and by setting said baseline address at said next number of addresses lower than said TOPM address, wherein said memory characterizer further determines a maximum number of bits ("MAX") to identify said TOPM address and a minimum number of bits ("MIN") to identify said memory device size.

14. The memory controller of claim 12 wherein said address translator forms said translated bits by concatenating subsets of bits and concatenating said subsets of bits reduces an amount of hardware by using bits from said linear address as at least one of said subsets for said translated address, said translated address being configured to access a range of physical addresses constituting said reclaimed memory hole.

15. The memory controller of claim 12, wherein said memory controller is part of a system including a memory having program instructions and program data, the memory having a physical address space of an integer power of 2 and comprised of a number of dual in-line memory modules ("DIMMs") symmetrically arranged over one or more partitions, said DIMMs having an identical size, and the reclaimed memory hole in said physical address space.

16. A method of reclaiming a memory hole to increase memory available to a processor, the method comprising:
adding a range of addresses at a first address being a first integer power of 2, said range of addresses being translatable into a reclaimed memory hole and having a range size equivalent to a restricted address space being reserved for other than system memory;
establishing a region of memory having a region size being any integer power of 2 in association with a baseline address, said baseline address being a second integer power of 2; and translating a linear address based on said baseline address into a translated address when said linear address is within said range of addresses;
wherein said translated address includes a first number of bits common to said baseline address;
wherein translating said linear address further comprises appending to said first number of bits a second number of bits indicative of a grouping to which said translated address is associated, and a third number of bits indicative of a specific address in said grouping, the appending further including:
determining a maximum number of bits ("MAX") to identify addresses in said region of memory, said maximum number of bits being a third integer power of 2 and defining a top of physical memory ("TOPM");
establishing a translated hole size as said region size by rounding a quantity of addresses for said restricted address space up to a next quantity having an integer power of 2;
setting said baseline address at a number of addresses below said TOPM address, said number of addresses being equivalent to said size of said region; and
using a portion of said baseline address as said first number of bits.

17. The method of claim 16 wherein using said portion of said baseline address further comprises:
determining a number of bits to use as said portion based on "N," where N=$\log_2$(size of said region of memory); and
selecting bits from bit MAX to bit N of said baseline address as said first number of bits.

18. The method of claim 17 wherein appending further comprises:
determining that a memory including said region of memory comprises a number of similarly-sized memory devices, wherein the size of each of said similarly-sized memory devices is a multiple of integer power of 2 and is a minimum number of bits ("MIN") for identifying said grouping;
inverting bits from bit N−1 to bit MIN of said linear address to form inverted linear address bits; and
selecting said inverted linear address bits as said second number of bits.

19. The method of claim 18 wherein appending further comprises selecting bits from bit MIN−1 to a lower bit of said linear address as said third number of bits.

20. The method of claim 19 wherein appending further comprises concatenating said first number of bits, said second number of bits and said third number of bits to respectively form bits MAX to N, bits N−1 to MIN, and bits MIN−1 to said lower bit of said translated address.

21. The method of claim 20 further comprising converting said translated address into a row-column-bank ("RCB") address.

* * * * *